A. E. RHOADES.
HANDWHEEL FOR LOOMS AND OTHER MACHINES.
APPLICATION FILED AUG. 5, 1920.
1,380,159.  Patented May 31, 1921.
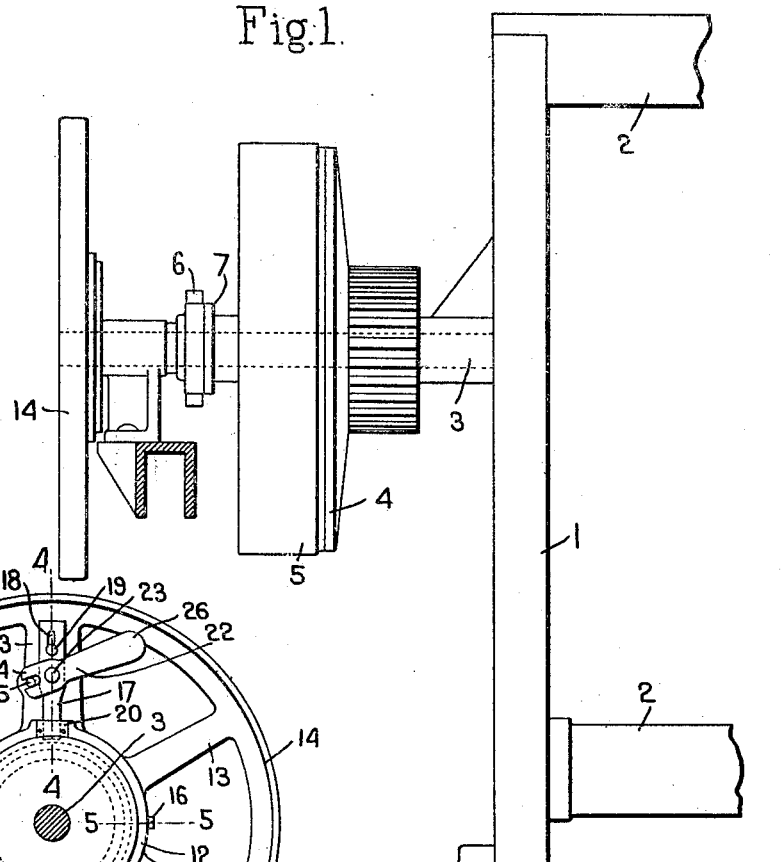
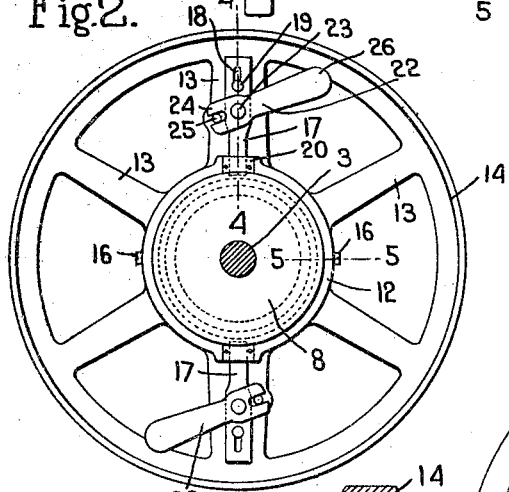
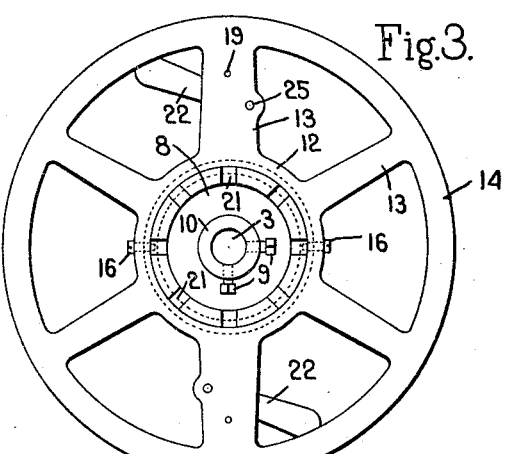
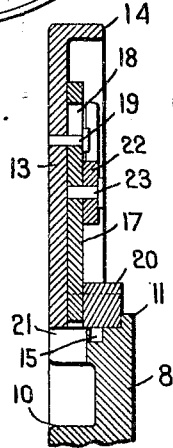
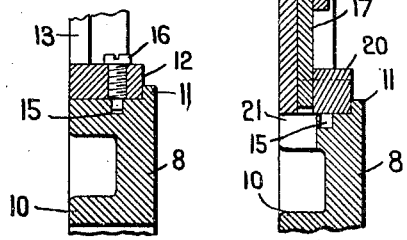
Inventor.
Alonzo E. Rhoades
by Heard Smith & Tennant.
Attys.

UNITED STATES PATENT OFFICE.

ALONZO E. RHOADES, OF HOPEDALE, MASSACHUSETTS, ASSIGNOR TO DRAPER CORPORATION, OF HOPEDALE, MASSACHUSETTS, A CORPORATION OF MAINE.

HANDWHEEL FOR LOOMS AND OTHER MACHINES.

1,380,159.  Specification of Letters Patent.  Patented May 31, 1921.

Application filed August 5, 1920. Serial No. 401,489.

*To all whom it may concern:*

Be it known that I, ALONZO E. RHOADES, a citizen of the United States, and resident of Hopedale, county of Worcester, State of Massachusetts, have invented an Improvement in Handwheels for Looms and other Machines, of which the following description, in connection with the accompanying drawing, is a specification, like characters on the drawing representing like parts.

Machines, such as looms, commonly have the power driven shaft provided with a hand wheel to enable the loom, or other machine, to be turned over by hand when the power is disconnected from the shaft. It is also common especially in looms to provide for the sudden stopping of the power driven shaft. When the shaft is thus stopped it not infrequently happens that the hand wheel, owing to its mass and momentum, is thrown off from the shaft, damaging the wheel and injuring any one in its path.

The object of the present invention is to provide a hand wheel, the main body of which is not permanently secured to the power driven shaft, but is freely rotatable upon a central or hub portion, together with means for locking the wheel body to the hub so as to permit the entire hand wheel to be utilized in the manual rotation of the shaft when desired, which locking means is automatically unlocked by centrifugal action upon the power driven rotation of the shaft and hand wheel so as to disconnect the wheel body from the hub. Thus when the shaft is being rotated by power the wheel body, which constitutes the greater portion of the mass of the hand wheel, is not rotated, or rotates very slowly upon the hub. Consequently, if and when the rotation of the shaft is suddenly stopped, little or no momentum is imparted to the wheel body. This enables the hub portion of the hand wheel, which is comparatively small and of comparatively small mass, to be readily and rigidly secured to the shaft without danger of being disconnected therefrom upon a sudden stopping of the shaft.

These and other features of the invention will appear more fully from the accompanying description and drawings and will be particularly pointed out in the claims.

In the drawings:

Figure 1 is a front elevation of a portion of a loom frame, a power driven shaft, clutch, and hand wheel embodying a preferred form of the invention.

Fig. 2 is a side elevation of the hand wheel looking toward the right of Fig. 1, with the shaft shown in cross section.

Fig. 3 is a side elevation of the hand wheel looking toward the left of Fig. 1.

Fig. 4 is a section taken on the line 4—4 of Fig. 2.

Fig. 5 is a section taken on the line 5—5 of Fig. 2.

While the invention is applicable to various machines having a power driven shaft, it is particularly applicable to looms and consequently a portion of a loom is herein illustrated in connection with the disclosure of a preferred form of the invention.

As the particular construction of the machine or the loom is not involved, there is only shown a side frame 1 with the ends of the connecting members 2. The main or power driven shaft 3 is shown as provided with a clutch disk 4 rigidly secured to the shaft and a driving pulley 5 slidably and rotatably mounted on the shaft and provided with a friction clutch surface to coöperate with the friction surface of the clutch disk 4. A coöperating yoke 6 engages a grooved sleeve 7 projecting from the hub of the pulley 5. The pulley 5 is driven from a suitable source of power by a belt. When the shaft 3 is to be rotated and the loom operated, the pulley 5 is slid on the shaft to engage the clutch disk 4 and is thereupon coupled to and rotates or drives the shaft. This mechanism is, however, simply illustrative of various means which may be employed for rotating the shaft and enabling the disconnecting of the power from the shaft.

In the case of looms and other machines it is frequently desired to stop the loom or machine suddenly upon the occurrence of some event, such as the breaking of the warp or weft in the case of a loom. When this event happens, through the action of suitable mechanism unnecessary to illustrate or describe, as such mechanisms are well known and familiar, the power is disconnected from the shaft and the mechanism of the machine, including the shaft, suddenly stopped.

It is also common to provide a hand wheel on the shaft to enable the shaft to be rotated manually to turn over the loom or machine and position the parts. When, however, the power is disconnected and the shaft suddenly stopped a great strain is placed upon the connection between the hand wheel and the shaft owing to the mass and momentum of the hand wheel and not infrequently the hand wheel is thrown off from the shaft injuring the hand wheel or injuring any one in its path or both.

In the present invention the hand wheel is made in two parts, a central or hub section and a surrounding wheel body.

The hub portion 8 is made of comparatively small size and mass and secured in any suitable way to the shaft. In the form illustrated set screws 9 are provided passing through a sleeve 10 of the hub and abutting or screwed into the shaft 3. This hub, at its periphery, is provided with a flange 11 which, with the remainder of the outer periphery of the hub, forms a seat for the wheel body.

The wheel body is shown as of spider-like form comprising a central annulus 12, radial spokes 13 and a rim 14, and made of any desired size and diameter, so as readily to be grasped by one or both hands when it is desired manually to rotate the shaft. The annulus 12 of the wheel body is seated on the hub 8 abutting the flange 11 and is freely rotatable on the hub. Suitable means are provided for maintaining the lateral position of the wheel body with respect to the hub. In the form shown the periphery of the hub inside the flange is provided with an annular groove 15 and set screws 16 are positioned in the annulus 12 with their ends projecting into the groove 15.

A simple and preferred form of means, automatically unlocked by centrifugal action upon the power driven rotation of the shaft and hand wheel, is illustrated for locking the wheel body to the hub. For this purpose a latch 17 is mounted for radial movement as upon one of the spokes 13 of the wheel body. In the construction illustrated this latch is guided in its movement at one end by a slot 18 formed therein, engaging a pin 19 secured in the spoke, and at the other end by sliding in a recess formed in the annulus 12 the face of which is covered by a block 20 secured to the annulus. The inner end of the latch is adapted, when projected inwardly, to engage in a notch or slot 21 of which a plurality are shown in the periphery of the hub 8. There may be as many of these latches as desired and in the construction illustrated two are shown diametrically arranged.

For automatically operating the latch by centrifugal action there is shown in the embodiment illustrated a lever 22 pivoted at 23 on the latch and fulcrumed by a yoke-shaped end 24 on a pin 25 projecting from the spoke 13. This lever has a heavy or massive head 26.

The operation will now be apparent. When the shaft 3 is not rotating, the wheel body is connected to the hub by the inner end of the latch 17 engaging a recess 21 in the hub. This may take place, upon turning of the hand wheel, by the weighted end 26 of one or more of the levers 22 causing one or more of the latches 17 to engage a notch or notches 21 in the hub, or by the manual operation of one or more of the levers 22. When the wheel body is thus connected to the hub the wheel body and hub move as one and the shaft may be manually rotated through the agency of the hand wheel in either direction. When power is connected to the shaft and the shaft rotates at any considerable speed centrifugal action causes the weighted ends 26 of the levers 22 to fly outwardly, thus sliding the latches 17 radially outwardly and disconnecting the wheel body from the hub. Thereafter the wheel body rotates slowly in the direction of rotation of the shaft or ceases its rotation so that little or no momentum is acquired by the hand wheel during the power driven operation of the shaft.

If and when the power is suddenly disconnected from the shaft and the shaft stopped no strain is placed upon the wheel body which remains stationary, or rotating very slowly. The size and mass of the hub is such that no material strain is placed on the connections between the hub and the shaft. Consequently, it is possible readily and easily to secure the head to the shaft and there is no danger of either the wheel body or the hub, or the entire wheel, being thrown off from the shaft.

Having thus described my invention, what I claim as new, and desire to secure by Letters Patent, is:

1. A hand wheel for manually rotating a power driven shaft comprising a hub secured to the shaft, a wheel body rotatably mounted on the hub, and means, automatically unlocked by centrifugal action upon the power driven rotation of the shaft and hand wheel, for locking the wheel body to the hub.

2. A hand wheel for manually rotating a power driven shaft comprising a hub secured to the shaft, a wheel body rotatably mounted on the hub, a locking latch movably mounted on one of said parts and engageable with the other to lock them together, and means operated by centrifugal action upon the power driven rotation of the shaft and hand wheel acting to move the latch to unlocking position.

3. A hand wheel for manually rotating a power driven shaft comprising a hub secured to the shaft, a wheel body rotatably mounted on the hub, a locking latch movably mounted on one of said parts and engageable with the other to lock them together, and means mounted on the wheel body operated by centrifugal action upon the power driven rotation of the shaft and hand wheel acting to move the latch to unlocking position.

4. A hand wheel for manually rotating a power driven shaft comprising a hub secured to the shaft, a wheel body rotatably mounted on the hub, a locking latch movably mounted on the wheel body and engageable with the hub to lock the body and hub together, and means mounted on the wheel body operated by centrifugal action upon the power driven rotation of the shaft and hand wheel acting to move the latch to unlocking position.

5. A hand wheel for manually rotating a power driven shaft comprising a hub secured to the shaft, a wheel body rotatably mounted on the hub, a locking latch mounted for radial movement on the wheel body and when projected inwardly engaging with the hub to lock the body and hub together, a lever pivoted on the latch, fulcrumed on the wheel body and having a heavy head whereby upon the power driven rotation of the shaft and hand wheel centrifugal action throws the heavy head of the lever outwardly and moves the latch to unlocking position.

In testimony whereof I have signed my name to this specification.

ALONZO E. RHOADES.